United States Patent Office 3,324,793
Patented June 13, 1967

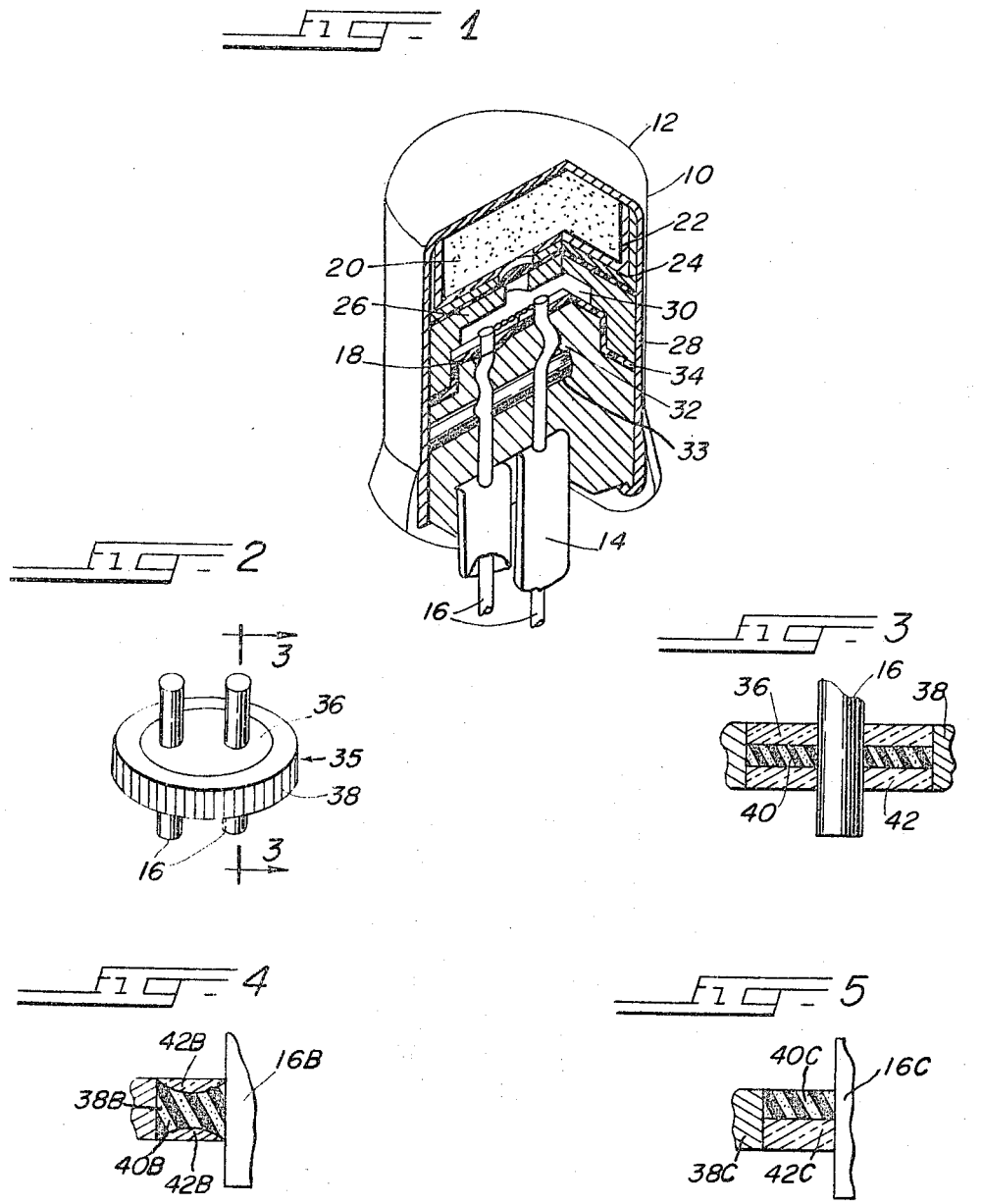

3,324,793
TRANSMISSION LINE TYPE SURGE ATTENUATOR FOR TRANSIENT VOLTAGE AND CURRENT IMPULSES
William J. Thomas, Arcadia, Calif., assignor to Detoronics Corporation, a corporation of Delaware
Filed Apr. 29, 1965, Ser. No. 451,810
9 Claims. (Cl. 102—28)

This invention relates generally to a transmission line type surge attenuator for precisely dissipating high potential energy charges in order to prevent the accidental firing of explosive devices or to prevent damage to sensitive electronic equipment.

The invention is useful in preventing the accidental firing of an explosive squib by RF energy produced by radar and radio; electrostatic energy produced by aircraft, moving vehicles, machinery and humans; and energy from other sources such as inductions from high current transmission lines. The squibs may be initiated not only by transmission of these energy forms through the pyrotechnic resistive bridgewire, but also by electrostatic discharges which occur within or through the pyrotechnic.

Furthermore, detonation of the squib also may occur as a result of impressing electric and electrostatic energy charges produced by frictional electricity caused by the motion of any aircraft or missile through the air, or the motion of any vehicle or equipment that may become charged by the induction which would cause a transient voltage to appear on the leads to the squib firing resistive element thereby causing the explosive charge to detonate.

The increasing use of helicopters, more powerful radars and other equipment producing high electrostatic and electromagnetic fields necessitated the development of squibs which would give the maximum protection against accidental ignition from these sources.

This invention contemplates the design and manufacture of a hermetic transmission line type surge attenuator device which will perform the composite function of preventing electrotatic plasma discharges and induced or compressed currents from being conducted through the pyrotechnic by establishing the proper termination parameters. By introducing an electrical conducting hermetic seal element within the transmission line type surge attenuator the composite structure would have a resistive component sufficient to reduce or attenuate the surge as the potential passes down along the lead conductors. By the time the transient voltage reaches the resistive bridgewire heating element within the squib, the voltage is below the necessary threshold to cause detonation of the pyrotechnic.

It is an object of this invention, thereby, to provide an integral conducting hermetically sealed surge attenuator having a resistive characteristic capable of precisely dissipating extraneous pulses and charges.

It is the further object of this invention that the conducting hermetically sealed surge attenuator be so constructed that it will not adversely affect or divert command electrical pulses of energy which are to be transmitted through the electrical conductors associated with the surge attenuator.

Furthermore, it is another object of this invention that the conducting hermetically sealed surge attenuator be substantially unaffected as to its physical and electrical characteristics when being subjected to high neutron flux densities.

An additional object of this invention is to provide a conducting high pressure hermetically sealed surge attenuator which will be non-magnetic. However, said conducting hermetically sealed surge attenuator shall be substantially strong and durable when being subjected to extreme thermal and mechanical shock without impairing the bond between the conductors psasing through the hermetically sealed surge attenuator device.

It is still a further object of the invention to eliminate the need for additional associated blocking devices, including diodes, varistors, co-axial spark gaps, butt spark gaps, deposited conducting film gaps and low density gas filled spark gaps in order to eliminate the firing of a squib ordnance device when the device is being subjected to extraneous discharges.

There are fundamentally two aspects that must be resolved in order to provide a militarily acceptable transmission line surge type attenuator for dissipating spurious transient voltages and current impulses. It is a generally acceptable practice in the construction of detonating squibs to insert a metallic shield between the detonating resistive element (bridgewire) and the pyrotechnic material. However, high frequency static discharges involving high frequency components could induce a high potential on the outer squib case and the metallic Faraday shield, which, in turn, could cause currents to flow through the pyrotechnic.

Another discharge effect which may accidentally set off the pyrotechnic may be created by a high current discharge travelling down one of the lead conductors through the bridgewire resistive element and out the other lead conductor thereby heating the resistive bridgewire element momentarily to a high enough temperature during the period of transient discharge to cause the pyrotechnic to fire.

In order to prevent the static discharge from detonating the pyrotechnic, the preesnt invention suggests the utilization of fundamental electrical parameters to properly terminate the transmission line in combination with the surge attenuator. The solution requires the knowledge of the total charge and the capacitance of the entire structure which is subjected to the initial pulse discharge.

The capacitance of the system combined with the capacitance formed by the surge attenuator are necessary factors in establishing the termination characteristic of the transmission line. If the magnitude of the transient voltage or discharge is substantial, then the surge attenuator should have a resistive component sufficient to reduce or attenuate the surge as it passes down the incoming conductor so that by the time the discharge or potential reaches the bridgewire resistive element within the squib, the voltage is below the threshold necessary to detonate the pyrotechnic material.

The invention will be better understood from the following detailed description of several illustrative embodiments thereof, reference being made to the accompanying drawings, in which:

FIGURE 1 is a side elevation view, partly in section, of the squib embodying one form of the invention;

FIGURE 2 is a view in elevation illustrating hermetically sealed surge attenuator unit;

FIGURE 3 is a view, partly in section, taken along line 33 of FIGURE 2;

FIGURE 4 is a sectional view similar to that of FIGURE 3, showing a modification of FIGURE 3; and FIGURE 5 is a sectional view, similar to FIGURE 4 illustrating a modification of the conducting refractory metallic layer of the surge attenuator.

Reference is first directed to the diagrammatic view, as shown in FIGURE 1, of a conventional squib detonating device illustrated by numeral 10. An outside cylinder or case 12 is coated with a waterproof covering. A hermetically glass sealed header 14 is affixed to said case 12. Conductor leads 16 are sealed through said header in a conventional manner and are extended internally within the squib to act as supporting elements for the bridge resistive wire 18. The pyrotechnic material 20 is encased within a metal shear spacer 22 and is integrally enclosed within a cup 24 having diaphragm ends. The cup 24 and the associated ends form a Faraday shield with the case 12.

The cup 24 is provided with an adjacent insulating material 26 and said material 26 provides a separation between the spacer 28 and the cup 24. An air space 30 encloses the bridge resistive wire element 18 thereby defining a volume surrounding the igniting resistive wire element 18. A plug 32 is connected by a sealant 34 to the spacer 28. The plug 32 has an air gap 33 located within it.

In conventional squib configurations, the conductors 16 are hermetically sealed through glass bead headers; however, it has been found that the accidental firing of the pyrotechnic will result when high currents or transient electrostatic charges are imposed upon the squib device. In order to alleviate this condition, an improvement is herein provided wherein a conducting hermetically sealed surge attenuator is substituted for the conventional type of glass to metal hermetic seal.

In order to produce an electrical conducting hermetically sealed surge type attenuator, the seal in the present invention shall be considered as a multi-layer assembly interfused by means of heat under controlled atmospheric conditions wherein the multi-layer assembly will possess at least one or more insulating zones and at least one interfused refractory metal and glass conducting zone. There shall be at least one or more zones acting as an insulator which is capable of withstanding hydrostatic pressure without damage to the seal.

The surge attenuator as shown in FIGURES 2 and 3 shall possess and be capable of withstanding a leakage rate of less than $1 \times 10^{-6}$ cubic centimeters of gas per second when pressurized with one atmosphere of helium. The conducting zone, or layer 40, which may be comprised of a fused admixture of a refractory metal and glass quartz or ceramic, performs as a charge dissipating or resistive layer having a resistance between 3,000 to 10,000 ohms between the conductors 16 and the header case 38. Certain military applications have required a resistance value of less than 3,000 ohms; however, a range from about 1,000 to 50,000 ohms has been utilized. It has been found that the practical and preferred range is between 3,000 and 10,000 ohms.

Furthermore, the hermetically sealed surge attenuator should have certain power carrying capabilities for discharging a minimum of four to six pulses from a 600 picofarad capacitor discharging up to 20,000 volts. To achieve a resistance of between 3,000 to 10,000 ohms between the conductor and the case 38, which also is a conductor, with a spacing of about 20 thousandths of an inch, it has been found that various types of glass zone fusions have been used in combination with a molybdenum refractory material combined with certain glass fusing admixtures.

The surge attenuator 35 consists of multi-layer assembly interfused by means of heat under controlled atmospheric conditions wherein the conductors 16 are fused within composite assembly of fused glass bead 36 (quartz or ceramic) and an outer header or shell 38, which is generally made of stainless steel type alloy or other compatible metals.

Fundamentally, the glass conducting multi-layer pellet or bead 16 contains an admixture composition of resistive elements combined in varying proportions with compatible glass powders of certain technical grades in order to obtain progressively increasing expansion and varying firing temperatures together with the required electrical conduction charcateristic.

Various glass carriers may be used such as glass compositions of borosilicate, aluminosilicate, soda lime, lead barium, soft lime, potash soda lime, ceramics, quartz and combinations thereof.

The powdered metallic refractory material which is interposed and sandwiched as laminate within the multi-layer pellet structure should be of a high temperature refractory type having a mesh size somewhat equal to or smaller than the mesh size of powdered glass used and fused according to glass sintering techniques. The metals that we have found to be most suitable are the refractory metals having exceedingly high melting points, such as tungsten, tantalum, molybdenum and various alloys and combinations of these refractory metals. Furthermore, these refractory metals have exceedingly low expansion characteristics when being subjected to elevated temperatures and are similar to glass. These refractory materials possess exceedingly low vapor pressure characteristics.

It is desirous that neither the glass nor the refractory metal should possess a high neutron cross section. However, in certain instances, metals such as rhodium, cobalt, manganeses, titanium, irridium, osmium and niobium have proven to be useful.

The choice of the refractory metal for the resistive component and the ultimate composition of the conducting based media is primarily dependent on the primary parameters, namely, temperature, coefficient of expansion and conductance. The conducting hermetically sealed surge attenuator may be a matched hermetic seal, a compression type seal or a low temperature type seal.

Where a compression seal is required, a high expansion glass composition, such as soda lime or barium glass is used for the seal and conducting fused media and the header 38 can be made of low carbon steel, stainless steel, or any other material having a coefficient of thermal expansion greater than the low expansion metals equivalent to or above $60 \times 10^{-7}$ units per unit length per degree centigrade.

In the case of a match seal various iron and nickel alloys are used, such as Kovar, Rodar or similar nickel alloys; and a matched low expansion borosilicate glass is used for the glass portion in combination with the refractory metal to form the refractory conductive fused media. It has been found that in certain instances, aluminum may be used for the header 38 and in this instance, the header case 38 requirement would specify a low temperature devitrifying glass to be combined with the refractory metal. The low temperature glass will have a coefficient of thermal expansion in a range of about 40 to $120 \times 10^{-7}$ units per unit length per degree centigrade.

The initial step in producing the surge attenuator is to preform a compressed disc structure composed of cemented powdered glass with and without the refractory metal contained therein. The discs without the refractory metals are designated as glass discs or insulator layers 42. Holes are molded integrally within the discs through which conductors may be easily inserted. The header case 38 is mounted on the fusing jig fixture and the conductors are inserted in place. The glass disc or insulator is initially placed in position and the preformed glass refractory metal disc is placed above. Subsequently, another insulating disc is inserted, thereby developing the multi-layer structure. The fusing jig fixture and composite multi-layer preformed glass refractory metal header is then subjected to fusing temperatures of about 1800° F.

The header 38 ultimately is affixed to the squib 10 case by soldering or welding or the squib and header 38 may be made integral during the fusing process.

It has been found that, in the preparation of the insulator layers 42 as well as the refractory metal glass electrical conducting disc 40, the refractory metallic material, such as molybdenum powder and glass should be graded to size in a range of about 250 mesh combined with a lubricant, binder and solvent. It has been found that the precentage, by weight, of the refractory material in the glass refractory metal composition, will vary from about 1% to 15% by weight with a preferred percentage of about 5% dependent upon the transmission line parameters.

In order to vary the parallel attenuator resistance from about 3,000 to 10,000 ohms, it is important to know the magnitude of the spurious charges and the transmission line characteristics. FIGURES 4 and 5 are modifications of the surge attenuator 34 wherein the electrical conducting disc 40B is deemed to be a shaped electrically resistive fused element or layer containing a fused admixture of glass and powdered molybdenum and the insulating layers 42B are bonded coextensively with said fused conducting layer 40B. FIGURE 5 is another modification showing the corresponding conducting layer 40C bonded coextensively with the insulating layer 42C.

In preparing the slurry, it has been found that, by using stearic acid as a lubricant, biphenyl as a binder and methanol as a solvent the suspension characteristic necessary in order to secure a reasonable homogeneous distribution of the materials may be obtained. After the solvent has been evaporated, each disc becomes approximately one-third of its initial size when being subjected to compaction in the disc forming die.

The disc sintering operation is performed in a conveyor type furnace; and there are successive heat zones ranging from 700° F. through 1800° F. The sintering technique is conventional and similar to the standard glass to metal seal manufacturing processes.

What is claimed as the invention is:

1. A detonating device containing an integral surge attenuator comprising:
   (a) a case;
   (b) an ordinance squib of pyrotechnic material located within the case;
   (c) a resistance-wire bridge supported within the case in close proximity to the pyrotechnic material;
   (d) a pair of electrical conductors connected to the wire bridge; and
   (e) an electrical surge attenuating header hermetically sealed to the case, through which at least one of the conductors passes, containing a fused layer of glass and refractory metal particles which forms a resistive electrical path between a conductor passing through the header and another conductor for dissipating surges of electrical voltage and current.

2. The detonating device of claim 1 wherein the pair of conductors passes through the fused layer.

3. The detonating device of claim 1 wherein the surge attenuating header comprises:
   a multi-layer assembly incorporating at least one insulating layer and at least one interfused refractory metal and glass conducting layer.

4. The detonating device of claim 1 wherein the refractory metal is molybdenum.

5. The detonating device of claim 1 wherein the fused layer comprises:
   (a) powdered glass; and
   (b) refractory metal particles, having a mesh size not greater than the mesh size of the powdered glass, sintered to the powdered glass.

6. The detonating device of claim 5 wherein the glass powder and the refractory metal particles are graded to size in a range of about 250 mesh.

7. The detonating device of claim 1 wherein the percentage, by weight, of the refractory metal in the fused layer is about 5%.

8. The detonating device of claim 1 wherein the length of a resistive electrical path between a conductor passing through the header and another conductor through the fused layer is approximately .020 inch and the electrical resistance of the path is within the range between 3,000 ohms and 10,000 ohms.

9. A detonating device containing an integral surge attenuator comprising:
   (a) a metal case;
   (b) an ordinance squib of pyrotechnic material located with the case;
   (c) a resistance-wire bridge supported within the case in close proximity to the pyrotechnic material;
   (d) a pair of electrical conductors connected to the wire bridge; and
   (e) an electrical surge attenuating header hermetically sealed to the case, through which the pair of conductors passes, containing a multi-layer assembly including at least one insulating layer and at least one conducting layer composed of sintered molybdenum and glass powders graded in size of a range of about 250 mesh with the molybdenum powder constituting 5% of the conducting layer by weight, the conducting layer forming a resistive path between each of the paired conductors and the case for dissipating electric voltage and current surges.

References Cited

UNITED STATES PATENTS

| | | | |
|---|---|---|---|
| 2,240,438 | 4/1941 | Durant | 102—28 |
| 2,377,804 | 6/1945 | Narvarte | 102—28 |
| 2,821,139 | 1/1958 | Apstein et al. | 102—28 |
| 3,082,691 | 3/1963 | Evans et al. | 102—28 |

FOREIGN PATENTS 553,461    5/1943    Great Britain.

BENJAMIN A. BORCHELT, *Primary Examiner.*

V. R. PENDEGRASS, *Assistant Examiner.*